R. F. HALL.
WEIGHING APPARATUS.
APPLICATION FILED NOV. 21, 1914.
1,414,083.
Patented Apr. 25, 1922.
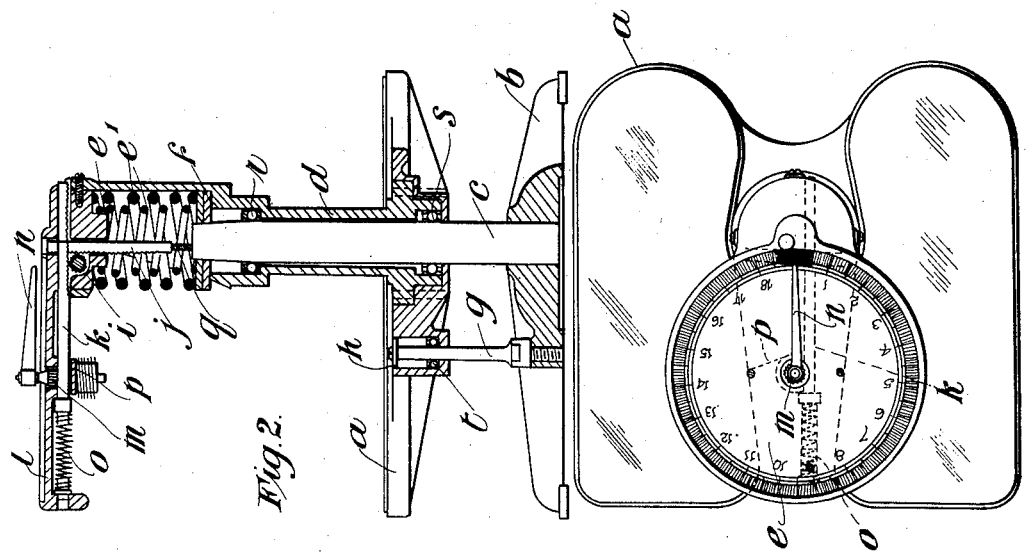
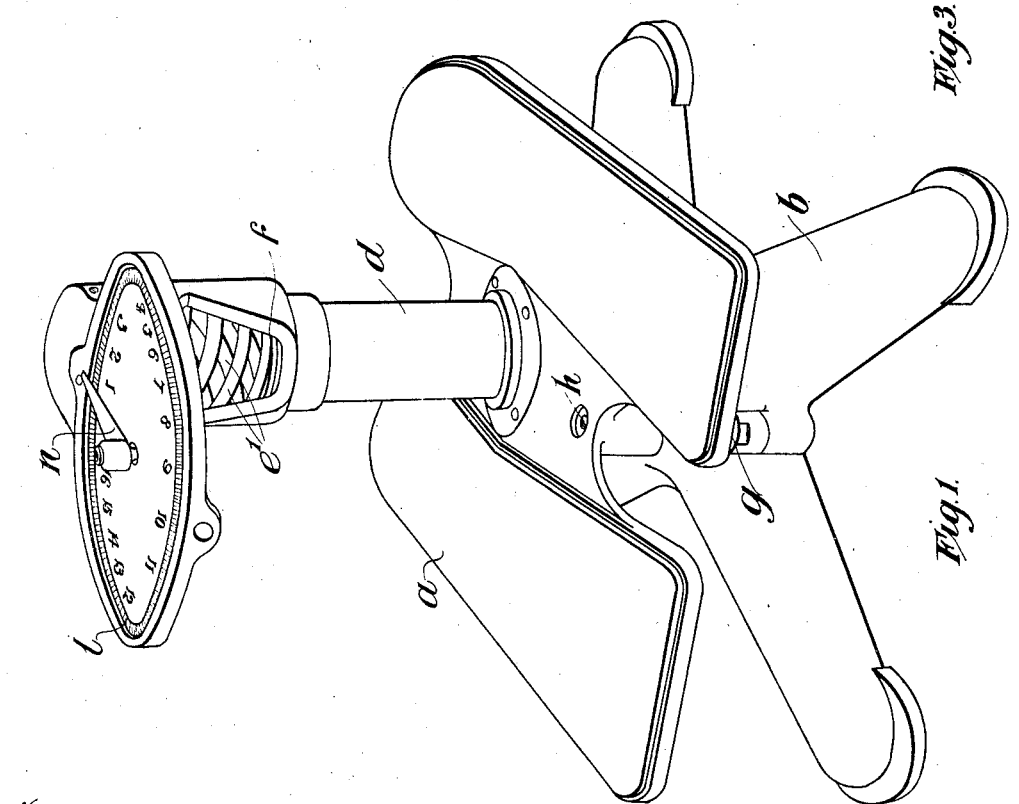

UNITED STATES PATENT OFFICE.

ROBERT FREDERICK HALL, OF MOSELEY, BIRMINGHAM, ENGLAND.

WEIGHING APPARATUS.

1,414,083.

Specification of Letters Patent.   Patented Apr. 25, 1922.

Application filed November 21, 1914.  Serial No. 873,302.

*To all whom it may concern:*

Be it known that I, ROBERT FREDERICK HALL, a subject of the King of England, and residing at Moseley, Birmingham, in the county of Warwick and the Kingdom of England, have invented certain new and useful Improvements in Weighing Apparatus, (for which I have filed an application for a patent in England Nov. 25, 1913, No. 27,075, Patent No. 27,075, dated Nov. 25, 1913,) of which the following is a specification.

My invention comprises a portable apparatus for weighing the human body, and has for its purpose the cheapening and improvement of machines for this purpose. One of the objects of my invention is to provide a low platform, for invalids, aged people, and children. I am enabled to obtain this very low platform in consequence of my invention of a central base pillar system, from which I suspend my moving and weighing platform upon a spring or springs, thus locating the weight to be registered considerably below the point of suspension. This system of location enables me to lighten the sustaining parts, to obtain portability, and also to reduce weight and general dimensions, and consequently the cost.

In some human weighing machines, mirrors are used for reflecting the face of the recording dial, and in others, large external, and sometimes vertical projections are adapted, so as to present the dial to the view of the person weighing himself.

My invention enables me to simplify these methods, by virtue of my central base pillar, upon which I suspend my moving platform, and upon which I carry my recording dial.

My recording dial, being a fixture to, or a part of, my moving and suspended platform casting, is designed to be brought up clear away from the feet, but between and in front of them, so that on looking down, the recording dial is face to face with the person weighing himself.

In order that this invention may be clearly understood, and readily carried into practice, reference may be had to the appended explanatory two sheets of drawings, upon which:—

Figure 1 is a perspective view of a weighing machine according to the present invention.

Figure 2 is a sectional side elevation of the weighing machine shown in Figure 1.

Figure 3 is a plan of the weighing machine shown in Figures 1 and 2.

In a convenient embodiment of the present invention, as shown in the drawings, $a$ is the platform adapted to accommodate the feet of the individual to be weighed; this platform, it is to be noticed, is disposed characteristically low in relation to the floor level. Below the platform $a$ is a base $b$ having a vertical pillar $c$, from the top of which is suspended a tubular portion $d$ secured to or forming part of the platform $a$, said tubular portion $d$ encircling the pillar $c$. In the enlarged upper part of the member $d$ which may be open at the front, as shown in Figure 1, two compression springs $e^1$ are incorporated adapted to occupy a position between a closure member $e$ at the top of the member $d$, and discs, washers, or the like $f$ which encircle and bear upon the reduced or tapered upper extremtiy of the pillar $c$. These members $f$ occupy a position above the shoulder formed by the enlarged upper portion of the tubular member $d$, and if they are secured in any suitable manner from axial movement in both directions to the upper extremity of the pillar $c$, the said members $f$ serve to retain the platform and recording portion as a connected member to the base, for carrying about purposes, thus preventing the platform portion from lifting away from the base portion.

In the drawing, as a means of preventing relative rotation, and also as a means of preventing separation of the two main parts of the machine, I have shown a separate and smaller pillar $g$ secured to the base and passing through the platform member, the said pillar $g$ having at its upper extremity a washer or enlargement $h$ which serves to limit the upward movement of the platform in relation to the base.

The pillar $c$ may be circular (as shown) or it may be of square or other suitable formation, coacting with a corresponding internal formation in the lower portion of the member $d$. This formation of the pillar may be employed as an alternative or additional means of preventing relative rotation of the two main parts of the machine.

The member $e$ carried by the sliding portion or platform of the machine carries a toothed pinion $i$ which meshes with a vertical rack $j$, and also a horizontal rack $k$ carried by a dial $l$ which is secured to or integral with the member e. The vertical rack j bears upon the top of the pillar c. The horizontal rack k meshes with a pinion m provided upon the recording finger m. The movements of these various parts are controlled by springs, o, p, and upon a weight being experienced by the platform a, the member e carrying the pinion i is lowered or depressed against the resistance of the springs $e^1$, and by reason of the rack j being restrained from downward movement by the upper surface of the pillar c, the pinion i is rotated and is thus caused to impart end-long movement to the rack k, which in turn rotates the pinion m, thereby displacing the recording finger in relation to the dial l which is suitably calibrated.

q is an adjustment member screwed within the end of the rack j so that the position of the latter in relation to the upper surface of the member e upon which such member q bears may be adjusted.

r, s, t are suitable ball bearings, the balls being advantageously retained by cages and being accommodated by annular spaces or recesses in the moving member.

I claim:—

1. A weighing apparatus, comprising a base, a vertical pillar mounted in the base, a weight-receiving platform, a vertically movable member supported by said pillar and connected to said platform, a horizontal dial and an indicator carried by the vertically movable member, operating means for the indicator actuated upon the depression of the platform, and means acting with increasing resistance opposing the downward movement of said platform.

2. A weighing apparatus, comprising a base, a vertical pillar mounted in the base, a weight-receiving platform, a vertically movable member supported by said pillar and connected to said platform, a horizontal dial and an indicator carried by the vertically movable member, rack and pinion operating mechanism for the indicator actuated upon the depression of the platform, and means acting with increasing resistance opposing the downward movement of said platform.

3. A weighing apparatus, comprising a base, a vertical pillar mounted in the base, a weight-receiving platform, a vertically movable member supported by said pillar and connected to said platform, a horizontal dial and an indicator carried by the vertically movable member, operating means for the indicator actuated upon the depression of the platform, said means comprising a vertical rack bearing against the vertical pillar, a pinion gear and horizontal rack carried by the vertically movable member, said pinion gear meshing with the said racks, and a pinion gear carried by the indicator meshing with said horizontal rack, and means acting with increasing resistance opposing the downward movement of said platform.

4. A weighing apparatus, comprising a base, a vertical pillar mounted in the base, a weight-receiving platform, a vertically movable member supported by said pillar and connected to said platform, a horizontal dial and an indicator carried by the vertically movable member, operating means for the indicator actuated upon the depression of the platform, means acting with increasing resistance opposing the downward movement of said platform, and means for preventing the rotation of the platform with respect to the pillar.

5. A weighing apparatus, comprising a base, a vertical pillar mounted in the base, a weight-receiving platform, a vertically movable member supported by said pillar and connected to said platform, a horizontal dial and an indicator carried by the vertically movable member, operating means for the indicator actuated upon the depression of the platform, means acting with increasing resistance opposing the downward movement of said platform, and means for limiting the upward movement of said platform.

6. A weighing apparatus, comprising a base, a vertical pillar mounted in the base, a weight-receiving platform, a vertically movable member supported by said pillar and connected to said platform, a horizontal dial and an indicator carried by the vertically movable member, operating means for the indicator actuated upon the depression of the platform, means acting with increasing resistance opposing the downward movement of said platform, and means for limiting the upward movement of the platform with respect to the base and for preventing the rotation of the platform about the pillar.

7. A weighing apparatus, comprising a base, a vertical pillar mounted in said base, a weight-receiving platform close to the base, a vertically movable member connected with the platform and vertically guided by said pillar, a horizontal dial and an indicator carried by the vertically movable member and disposed close to the platform, actuating means for the indicator carried by said vertically movable member and bearing against said vertical pillar and means acting with increasing resistance opposing the downward movement of said platform.

In testimony that I claim the foregoing as my invention I have signed my name in presence of the subscribing witnesses this 10th day of November, 1914.

ROBERT FREDERICK HALL.

Witnesses:
KATHLEEN M. THOMPSON,
ERNEST HARKER.